United States Patent
Freitas et al.

(10) Patent No.: US 7,175,406 B1
(45) Date of Patent: Feb. 13, 2007

(54) ACTIVE MOLD APPARATUS

(75) Inventors: Daniel D. Freitas, Manteca, CA (US); Robert F. Miller, Lafayette, CA (US)

(73) Assignee: PRD Company, Inc., Hayward, CA (US)

( * ) Notice: Subject to any disclaimer, the term of this patent is extended or adjusted under 35 U.S.C. 154(b) by 0 days.

(21) Appl. No.: 10/885,486

(22) Filed: Jul. 6, 2004

Related U.S. Application Data

(63) Continuation-in-part of application No. 10/806,657, filed on Mar. 22, 2004, and a continuation-in-part of application No. 10/806,678, filed on Mar. 22, 2004.

(60) Provisional application No. 60/456,579, filed on Mar. 21, 2003, provisional application No. 60/456,847, filed on Mar. 21, 2003.

(51) Int. Cl.
*B29C 45/14* (2006.01)

(52) U.S. Cl. ................. 425/126.1; 425/128; 425/129.1

(58) Field of Classification Search ................ 425/117, 425/126.1, 128, 129.1

See application file for complete search history.

(56) References Cited

U.S. PATENT DOCUMENTS

| 2,994,107 | A | * | 8/1961 | Quinche ................... 425/126.1 |
| 3,244,788 | A | * | 4/1966 | Michel et al. ............ 425/129.1 |
| 3,256,378 | A | * | 6/1966 | Hauf .......................... 264/267 |
| 5,683,647 | A | * | 11/1997 | Kawasaki et al. ........ 425/129.1 |

* cited by examiner

*Primary Examiner*—Robert B. Davis
(74) *Attorney, Agent, or Firm*—Philip A. Dalton

(57) ABSTRACT

Apparatus for forming a plastic attachment on an article includes clamping mechanisms which position the article and form a mold surrounding the appropriate section of the article. During the process of molding the plastic attachment, the article may be moved through the mold to facilitate forming the attachment along a length of the article. The apparatus is illustrated by an annular mold for forming mating plastic couplings around the ends of tubes such as corrugated and smooth-walled metal pipes.

5 Claims, 3 Drawing Sheets

ACTIVE MOLD APPARATUS

This is a continuation-in-part of U.S. patent application Ser. No. 10/806,657 and 10/806,678, both filed Monday Mar. 22, 2004; which are continuations-in-part of U.S. patent application Ser. No. 60/456,579 and 60/456,847 respectively, both filed Mar. 21, 2003.

BACKGROUND OF THE INVENTION

1. Field of the Invention

The present invention relates to molds and processes for forming plastic articles by molding. More particularly, the present invention relates to molds and processes for forming plastic articles on metal substrates.

2. Description of the Related Art a. Passive Molds

It is known to form thermoplastics and other materials by injection into passive molds. It is understood that passive molds comprise a cavity in metal or other material into which a semi-liquid substance is injected or extruded, usually under light pressure, until the mold cavity is filled. The injected or extruded work piece is allowed to set up and then the mold is opened and the work piece (often comprising polymers) is removed and allowed to cure prior to storage or shipping or additional forming (for example, by machining) at subsequent stations. There can be multiple cavities within the same mold and the material can be distributed via a manifold.

b. Molding Plastic on Metal

There are a number of potential applications for composites comprising plastic members formed along the edges of substrates such as metal strips and other materials. Examples include plastic couplings formed along the ends of metal pipes.

The inherent difficulty of forming a plastic component to a specified shape along the edge of a metal strip, with adequate bonding between the two materials, is increased by the necessity of using a slotted mold so that only the edge of the strip is within the mold. The difficulties may be increased even further (a) if it is necessary to move the metal substrate through the mold to permit forming an elongated plastic component or to ensure coverage of the metal by the plastic; (b) when forming the plastic on a curved substrate; and (c) for applications which require that the plastic-metal composite provide a seal against fluid leakage or against corrosion of the metal. Most or all of these considerations are involved in any attempt to form plastic couplings on pipe ends.

SUMMARY OF THE INVENTION

It is among the objects of the present invention to provide apparatus, methods and processes for molding plastic. In one aspect, the apparatus comprises a flexible, active mold using replaceable constituent parts such as dies and inserts which adapt the mold to forming work pieces of different profiles, of different shapes and sizes, and which are inserted into the mold apparatus and forced onto the work piece to force the work piece under pressure to take the form of the dies and the resulting mold cavity.

In another aspect, the present invention is embodied in an active mold for forming plastic components along the edges of metal strips and tubes. The present invention is also embodied in a process for forming plastic components along the edges of metal strips and tubes. The mold, method and process are especially applicable to large work pieces, which would require very high cost passive molds. The active die according to the present invention, which can be progressive, eliminates this need.

In another aspect, the present invention is embodied in apparatus for forming an active mold for forming plastic components along the edges of metal strips and tubes.

In yet other aspects, the present invention is embodied in a method for forming an active mold, including the walls thereof, along the edge of a metal strip or tube; and in a process for using the mold to form a plastic article along the edge of the metal strip or tube.

In another, more specific apparatus aspect, the present invention is embodied in active mold apparatus for forming a plastic attachment along an end of a tube, comprising: (a) a first assembly including a first member adapted for gripping the tube along the outside surface thereof and for releasing the tube; (b) a second assembly adapted for moving the gripped tube between a first position spaced from the mold and a second position at the mold, at which second position the first member forms a first end wall of the mold; (c) a third assembly adapted for moving to and from the tube and forming a first side wall of the mold outside the tube when the third assembly is at the mold; (d) a fourth assembly adapted for moving to and from the mold and for forming a second side wall of the mold inside the tube when the fourth assembly is at the mold; (e) a fifth assembly adapted for forming a second end wall of the mold at the end of the mold opposite the first end wall; (f) at least one inlet for passing plastic charge into the mold cavity; (g) a rotation system adapted for rotating the first assembly and thereby rotating the gripped tube around the mold cavity, for distributing the plastic charge throughout the mold cavity; and (h) the fifth assembly being adapted for moving the second end wall along and between the first and second side walls, to apply pressure to plastic charge in the mold cavity, and thereby form the plastic to the shape of the mold walls and cavity.

In a related aspect, the section of the second side wall adjacent the end of the tube is spaced from the inside surface of the tube for forming a lip on the plastic attachment along the inside surface of the tube adjacent the end.

In another, more specific method and process aspect, the present invention is embodied in a method and process for forming a plastic attachment along an end of a tube within a mold, comprising: (a) gripping the tube along the outside surface thereof; (b) moving the gripped tube to a position proximate the mold and thereby forming a first circular end wall of the mold; (c) forming a first circular side wall of the mold radially outside the tube; (d) engaging the inside surface of the tube and thereby forming a second circular side wall of the mold radially inside the tube, the second circular side wall forming a tapered space between the second circular side wall and the inside surface of the tube along the end thereof; (e) forming a second circular end wall of the mold at the end of the mold opposite the first circular end wall; (f) injecting plastic into the mold; and (g) forcing the second circular end wall against the plastic in the mold to apply pressure to the plastic, and rotating the gripped tube through the mold, thereby forming the plastic in the mold, including forming a lip extending into the tapered space between the tube and the second circular side wall.

BRIEF DESCRIPTION OF THE DRAWINGS

The present invention is described with respect to the following drawings.

DETAILED DESCRIPTION

1. Overview

Figure 1:
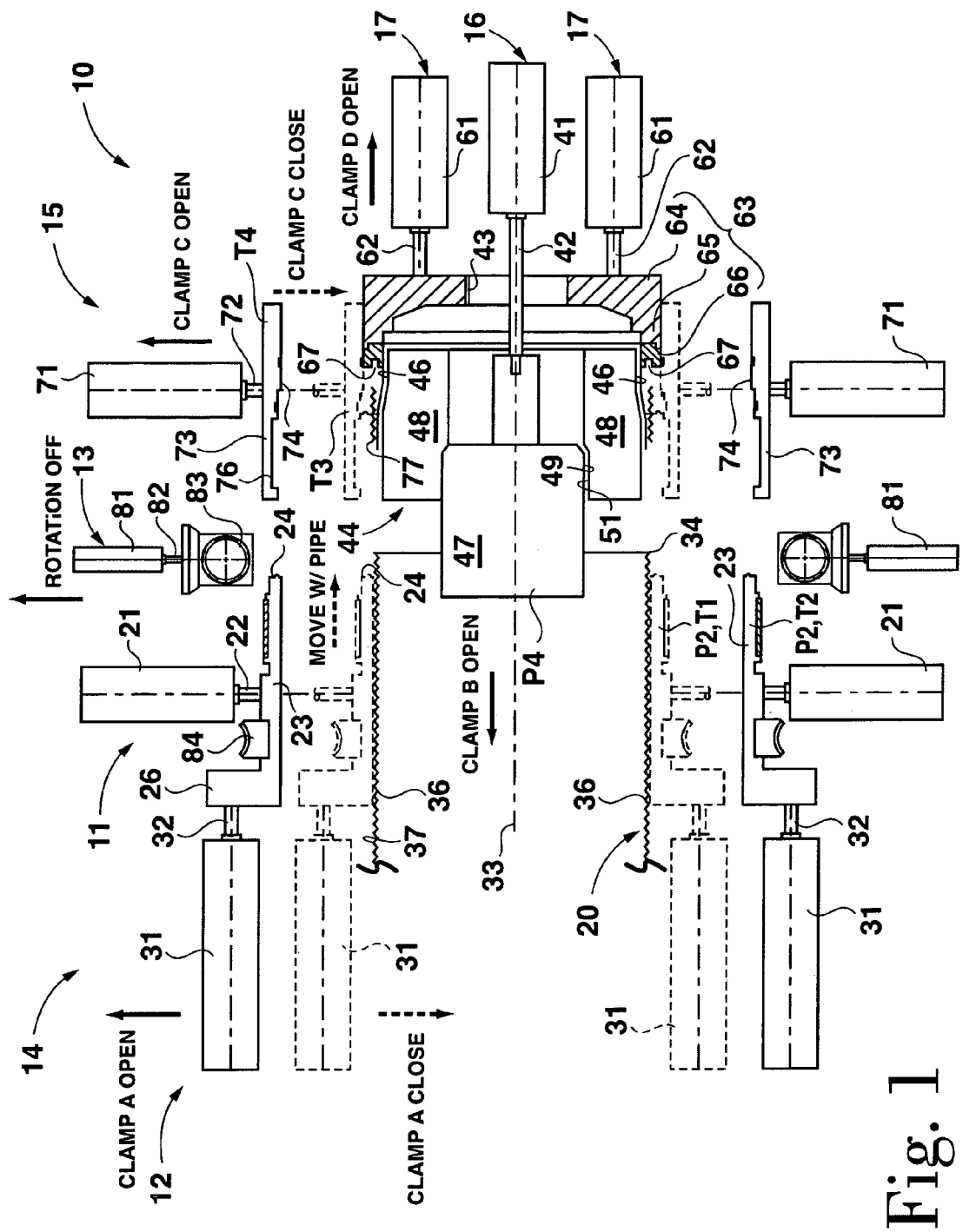
FIG. 1 illustrates active or reconfigurable mold apparatus having movable walls which are (1) depicted in an open configuration preparatory to forming a plastic attachment on an article such as a tube, and (2) depicted, in phantom, in a closed configuration defining a mold for forming the plastic attachment.
Figure 2:
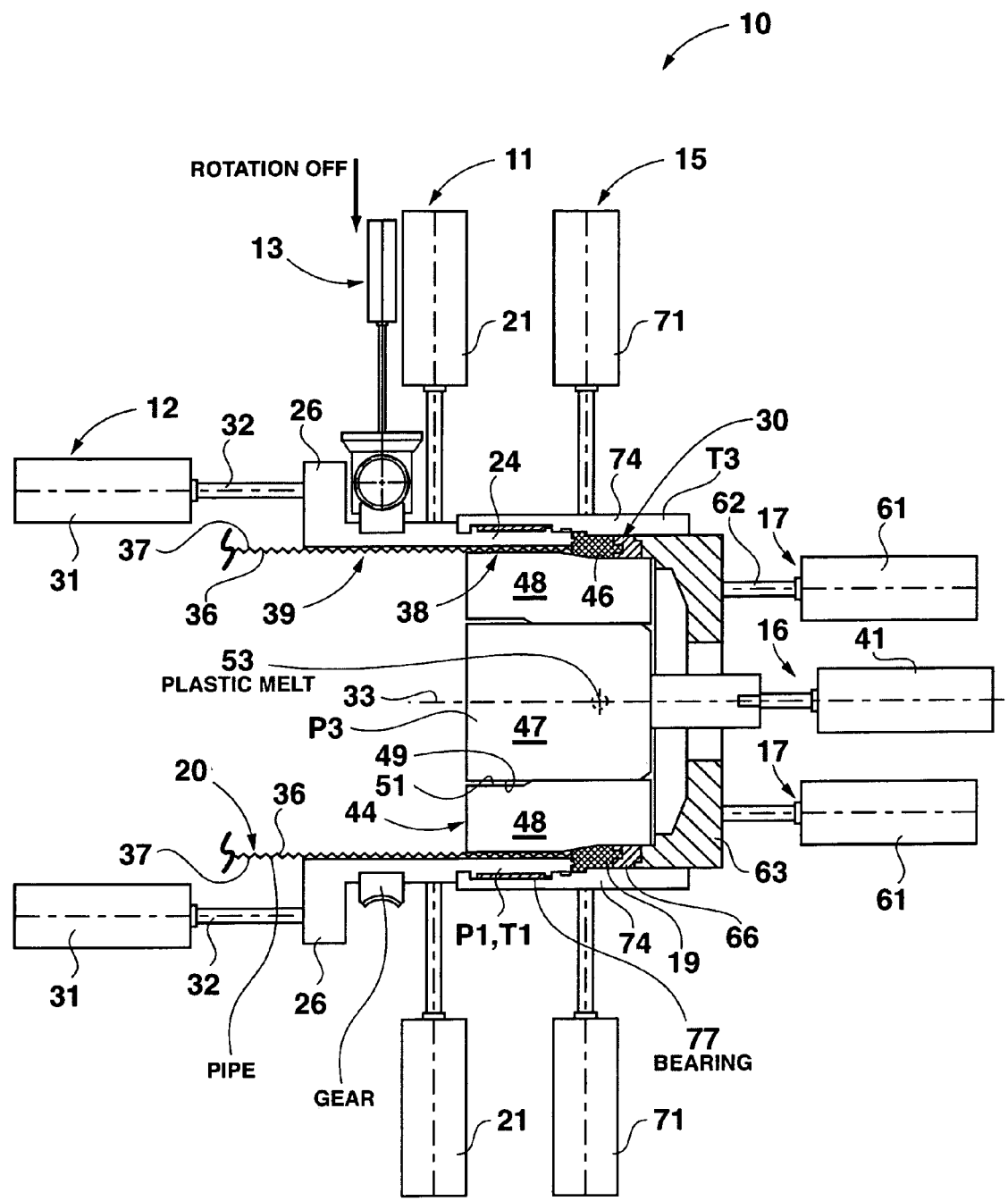
FIG. 2 depicts the apparatus of FIG. 1 with the movable walls in the closed configuration forming the mold over the tube on which the plastic attachment is formed.

FIGS. 1 and 2 depict an apparatus or assembly 10 comprising clamping assemblies 11, 12, 14, 15, 16 and 17, which form an active or reconfigurable mold 30. The active mold 30 is used to form a plastic attachment such as 19 along an edge or end 34 of a strip or tube 20. The illustrated tube 20 is a corrugated pipe and the attachment 19 is a coupling which provides ready joinder of such pipes in the field. The illustrated mold 30 is circular or annular, to permit forming the plastic coupling 19 as a continuous member around the end 34 of the pipe 20 in a single molding sequence.

In FIG. 1, the pipe 20 is shown located within the mold apparatus 10 at a position which is spaced (axially or longitudinally) to the left of the position at which the pipe is inside the assembled mold 30. FIG. 1 also depicts the various clamp assemblies or systems 11, 12, 14, 15, 16 and 17 in their withdrawn positions, which correspond to the mold being in the open or unconfigured condition, and to the pipe 20 being retracted from the location of the assembled mold 30.

Cylinders 21, 31 and 71 of clamp assemblies 11, 12 and 15, respectively, and members 23 and 73 of clamp assemblies 11 and 15, respectively, may be formed in generally circular arrays around the pipe 20 and/or the mold 30. Cylinders 61 of clamp assembly 17 may be mounted in a generally circular array around cap 64. Optionally, and preferably for tube applications, the apparatus 10 comprises a chain or gear drive system 13 for rotating the tube 20 around longitudinal axis 33 and through the cavity of the mold 30 during the process of forming the plastic attachment 19.

For convenience, the words "tube" and "pipe" are used interchangeably, and refer both to tubular articles and assemblies, and to straight-walled and corrugated construction. As used here, "coupling" includes components for joining sections of pipe, typically to form an extended length of metal pipe. The pipe 20 is depicted as having, in addition to longitudinal axis 33, an inside (or bottom) surface 36; an outside (or top) surface 37; an edge (or end) section 38 extending along the end 34 of the pipe; and a body section 39 extending adjacent the edge section 38. Positions and surfaces inside the pipe 20 (or the extended pipe) are referred to as being "inside" or "radially inside" the pipe, whereas surfaces and positions outside the pipe are referred to as being "outside" or "radially outside" the pipe.

The mold, method and process according to the present invention are especially applicable to large work pieces, which would require very high cost passive molds. The active die according to the present invention, which can be progressive, eliminates this need.

2. Construction and Operation of Apparatus a. Clamping Assemblies 11 and 12

As illustrated in FIG. 1, in combination, clamping assemblies 11 and 12 form clamping assembly 14. As explained below, the two clamping assemblies (subassemblies) 11 and 12 are mounted to a ring 26 and move in unison to grip the pipe 20 and to move the pipe to and from the mold 30.

Referring further to FIG. 1, clamping assembly 11 comprises a plurality of gripping members 23 positioned outside and around the periphery of the pipe 20, in a generally circular array, and a plurality of hydraulic cylinders 21 positioned around the pipe, also in a generally circular array. Each cylinder 21 has rod 22 thereof connected to a member 23 for collectively moving the members bidirectionally transverse to the pipe, between position T1 at the pipe 20 and position T2 withdrawn from the pipe, so that the members cooperatively grip and release the pipe. Members 23 are mounted to the ring member 26, which is positioned outside and around the periphery of the pipe 20.

Clamping assembly 12 comprises a plurality of hydraulic cylinders 31, which may be mounted in a generally circular array around pipe 20. Each cylinder 31 has a rod 32 thereof mounted to ring member 26 for moving the ring member 26 bidirectionally generally parallel to the pipe. As mentioned, the ring member 26 is also connected to members 23 of clamping assembly 11 and, thus, the bidirectional movement of the ring by cylinders 31 of clamping assembly 12 moves the assembly 11, and the pipe gripped by assembly 11, between positions P1 and P2. At position P2, FIG. 1, the rods 32 of cylinders 31 are retracted and the gripped pipe 20 is to the left, withdrawn from the position of the assembled mold. At position P1, FIG. 2, the rods 32 are extended, the gripped pipe is to the right, within the volume of the assembled mold, and the front ends of the members 23 form the circular left end wall 24 of the assembled mold.

b. Clamping Assembly 15

Referring to FIG. 1, clamping assembly 15 comprises a plurality of members 73 and a plurality of hydraulic cylinders 71. The cylinders 71 and the members 73 may be positioned in generally circular arrays, outside and around the volume occupied by the assembled mold. Each cylinder 71 has a rod 72 which is connected to a member 73 for moving the member bidirectionally transverse to the mold, toward and away from the mold, that is, between position T4 spaced from the mold and position T3 at the mold. At T3, the members 73 collectively form a closed circular array which is the outer wall 74 of the assembled mold 30. See also FIG. 2.

c. Clamping Assembly 16

Referring again to FIG. 1, clamping assembly 16 comprises a cylinder 41 having an extendible rod 42 (which extends through hole 43 in cap die 64), to which is mounted a cylindrical inner die 44. The die 44 is formed by a first pair of opposite (left and right side) semi-circular section members or quadrants 47—47, and a second pair of opposite (top and bottom) semi-circular section members or quadrants 48—48. The quadrants are interconnected and biased radially inwardly against one another by springs 52—52. See FIGS. 3 and 4. Rod 42 is connected to quadrants 47—47. Operation of the cylinder 41 moves the quadrants 47—47 bidirectionally parallel to the pipe 20, between a position P3 at the mold 30, FIG. 2, and a position P4 spaced longitudinally to the left of the mold, FIG. 1.

Figure 3:
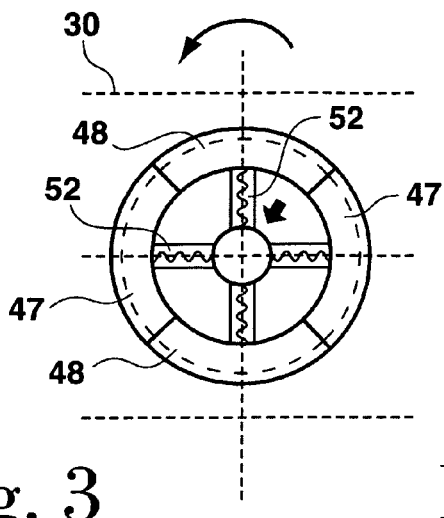
FIGS. 3 and 4 schematically depict the expandable inner die of FIGS. 1 and 2 in the contracted condition and in the expanded condition, respectively.

The quadrants 47—47 and 48—48 form a cam arrangement defined by the upper and lower surfaces 49—49 of each member 47 and the mating, stepped surfaces 51—51 of each member 48. Referring to FIGS. 1 and 3, when the rod 42 is extended, the quadrants 47—47 of the die are withdrawn to the left in FIG. 1, away from camming engagement with the quadrants 48—48, thereby allowing the four quadrants to be contracted inwardly by the springs 52—52, so that the outer surface of the die 44 is spaced radially inwardly from the mold 30. See FIG. 3. This clearance allows the pipe 20 to be moved to and away from the axial position L1 at which the mold is assembled.

Figure 4:
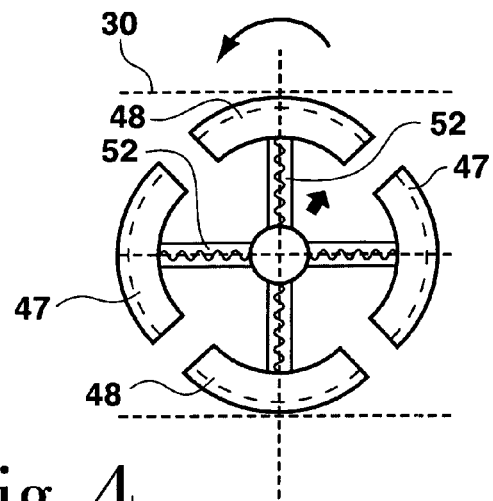

Referring to FIGS. 2 and 4, when the rod 42 is retracted, the side quadrants 47—47 are moved to the right, to the mold, and the cam surfaces 49—49 and 51—51 overcome the force of the springs 52—52 and move the four quadrants of the die radially outwardly. As a result, the outer surfaces of member 44, specifically of quadrants 47—47 and 48—48 thereof, form closed circular interior wall 46 of the assembled mold 30. See FIG. 4.

Please note, the forward section of surface 46 tapers inwardly, away from the pipe 20, along the region adjacent the end of the pipe. This taper allows molten plastic in the mold 30 to form a lip in the tapered space along the inside of the pipe during the molding process.

d. Clamping Assembly 17

Referring to FIGS. 1 and 2, clamping assembly 17 comprises a cap die 63 and a plurality of cylinders 61, each having an extendible rod 62. The cap die 63 is mounted to the rods 62 and comprises cap 64 and a removable lip die, illustratively grooved lip die 66. Operation of the cylinders 61 to extend or retract the rods 62, moves the cap die 63 bidirectionally leftward and rightward, between a position at the assembled mold and a position slightly withdrawn from the mold. At the mold, the lip die 66 is the right end wall of the mold.

The operation of the clamping assemblies as described brings together the opposite end walls 24 and 66 and the opposite side walls 46 and 74, and closes the mold 30. See FIG. 2. The walls of the mold 30 include one or more sprues 53 through which plastic, typically in a semi-liquid or molten state, is injected or extruded into the mold. One suitable material is HDPE (high density polyethylene), which is heated to 300–500° F. prior to being forced into the mold.

With the mold assembled and liquid or semi-liquid plastic charge forced into the mold, operation of the cylinders 61 continues the extension of the rods 62, so that the lip die/end wall 66 applies increasing pressure to the molten plastic charge in the mold, to force and distribute the charge throughout the mold and into the cavities of the mold. The plastic charge is forced into the tapered cavity space between the tapered inner side wall 46 of the mold and the inside surface of the front edge of the pipe, thereby forming the plastic into a lip inside and along the front edge of the pipe 20. This lip contributes to the attachment 19 being joined to and sealed to the pipe 20. The plastic is formed into an annulus having the cross-sectional shape of the end walls 24, 66 and the side walls 46 and 74.

In addition to hydraulic cylinders, the drive means used in the various clamping assemblies can be air cylinders, electric motor-driven systems, etc.

e. Rotation System 13

Rotation drive system 13 comprises at least one electric motor 81 having an extendible rod 82, a drive gear device 83 mounted on the rod, and follower or wheel gears 84 mounted on members 23 of clamping assembly 11. With the members 23 at the mold (position L1, T1), motor 81 is operated to extend the rod 82 and advance the drive gear device 83 into engaging the wheel gears 84 so that operation of the drive gear device 83 causes the gears thereof to rotate the wheel gears 84 and rotate the gripped pipe 20 around axis 33 and along the inside of the mold 30. Reverse operation of the motor 81 to retract rod 82 disengages the drive gear device 83 from the wheel gears 84, preventing rotation of the pipe 20 and allowing the clamping assembly 11, members 23 and the gripped pipe to be withdrawn from the mold by clamping assembly 12.

The use of rotation is optional. During the sequence of introducing plastic charge and/or forming the charge into an attachment such as 19, the rotational system 13 can be used to rotate the gripped pipe 20 through the cavity of the mold 30, to promote uniform distribution of the plastic throughout the mold cavity.

Figure 5:
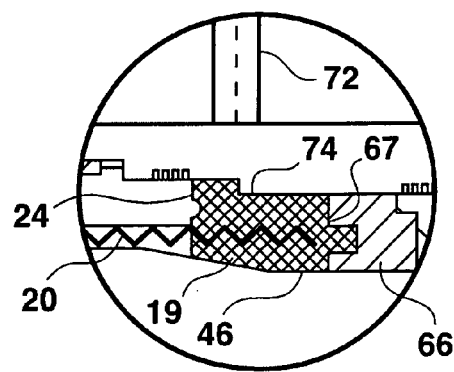
FIGS. 5 and 6 depict grooved and tongued lip dies, respectively, for forming mating couplings.
Figure 6:
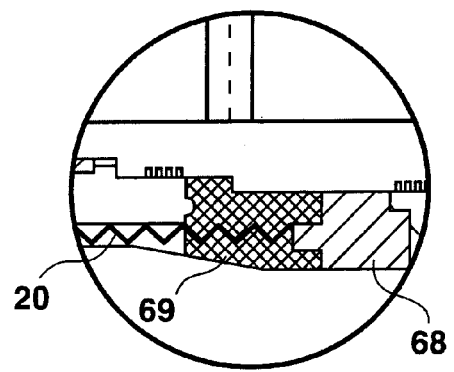

Complementary lip dies can be used to form mating couplings. Grooved lip die 66, FIGS. 2 and 5, forms a tongue-containing coupling 19. Tongued lip die 68, FIG. 6, forms grooved coupling 69. Obviously, by forming a tongue-containing coupling on one end of a number of pipes and forming a mating, grooved coupling on the opposite end of each pipe, the pipes may be joined end-to-end to form a continuous long pipe from relatively short, prefabricated, coupling-containing pipe sections 20.

3. Method and Process

Referring to FIGS. 1 and 2, to form a plastic attachment on a tube such as pipe 20, initially hydraulic cylinders 21 of clamping assembly 11 are operated to extend rods 22 and move the members 23 radially inward, into gripping engagement with the pipe.

Cylinders 31 of clamping assembly 12 are operated to extend rods 32 and thereby move the clamping assembly 11, members 23 and the gripped pipe 20 rightward, generally parallel to the pipe axis 33, to the mold position. At this position, the leading edges of members 23 form the left end wall 24 of the mold.

Cylinders 71 of clamping assembly 15 are operated to extend rods 72 and the members 73 radially inward to move the members 73 to the mold position, forming the outer side wall 74 of the mold.

Cylinder 41 of the clamping assembly 14 is operated to retract rod 42, thereby expanding internal die 44 radially outward via the camming action of the quadrants or sections 47—47 and 48—48, that is, expanding the quadrants or sections 47—47 and 48—48 outward against the action of the associated springs 52—52, and forming these sections into the tapered inside wall 46 of the mold. See also FIG. 4.

Plastic material is injected into the mold via the sprue(s). One suitable material is HDPE (high density polyethylene), which is preheated to 300° F. to 500° F.

Cylinders 61 of clamping assembly 17 are actuated to extend the rods 62 and move the cap die 63 (comprising cap 64 and lip die 66 or 68 leftward) so that the lip die forms the right end wall of the mold 30. The continued operation of the cylinders 61 applies increasing pressure to the molten plastic charge to force and distribute the charge throughout the mold and form the attachment 19 or 69 in the shape of the mold. During this process, the plastic charge is forced into the cavity between the tapered inner side wall 46 of the mold and the inside surface of the front edge of the pipe, thereby forming the plastic into a lip inside the front edge of, and along the pipe. This lip contributes to the coupling 19 or 69 being joined to and sealed to the pipe 20.

Optionally, when the plastic charge is being introduced and/or formed into an attachment, the drive gear arrangement 83/84 is operated to rotate the clamping assembly 14, thereby rotating the gripped pipe 20 around the cavity of the mold 30 to promote uniform distribution of the plastic throughout the mold cavity.

After the plastic cools and solidifies, the composite pipe-coupling is removed from the mold. In one suitable sequence, the rotation of the pipe is stopped and the drive gear device 83 is withdrawn from the wheel gears 84 by cylinders 81; cylinders 61 and 71 are retracted and cylinder 41 is extended to allow the member 44 to contract inwardly to release the pipe; and cylinders 31 and 21 are retracted to withdraw the pipe from the mold and to release the pipe from the grip of members 23. The pipe-coupling composite can then be removed from the mold apparatus.

As indicated above, the couplings (or sealing gaskets or cuffs) such as 19 and 69 are molded onto smooth or corrugated pipe ends, and embed the bare, cut-off pipe ends in a protective cocoon of plastic which provides corrosion protection. Molded plastic can be formed by rotating the associated pipe end, laying on the extruded plastic bead around the circumference of the pipe end, and folding over the material built up on the end into the interior of the pipe. After set up, the resulting plastic coupling can be machined to provide neater looking end(s). Care is taken not to place too much material into the interior diameter of the pipe, because excess material can impede and restrict flow within the pipe.

Preferably, to form the couplings used here, inside and outside mold dies are used, as described. Molten or semi-molten plastic is extruded to fill the void between the inside and outside dies, then under pressure the dies clamp and push the semi-molten extruded material into the cavities in the mold dies to create the tongue and groove profile or other selected profiles. The use of inside/outside dies under pressure moves the necessary plastic material to the outside of the pipe and a reduced amount of material to the inside diameter of the pipe sufficient to embed the pipe end and provide the necessary corrosion protection.

In one of the pipe forming techniques used by the assignee, three layer polyethylene is coated onto a metal strip, top and bottom, before the strip is formed into smooth wall or corrugated pipe. Such a plastic coated pipe is compatible with plastic welding and plastic welding to a variety of profiles and with a variety of couplings or cuffs or sealing gaskets and other plastic components.

4. Additional Advantages and Considerations

Unlike a passive injection mold die, the flexible active dies in accordance with the present invention change the shape of the quantity of substance to be formed by effectively shoving or pushing the dies into the measured quantity of work piece material under pressure and causing the work piece to take the shape of the dies and cavity. These flexible dies of course have to seal off any escape spacings which would allow the work piece to escape the mold.

Another advantage, one illustrated by the above detailed examples, involves the manufacture of tubular products, and the ability to mold one product on top of, or in addition to, an existing product. In order to use these tubes in certain applications, it is necessary to provide pipe joint coupling systems. Using a flexible active mold, a measured amount of work piece material such as polymer is placed on the existing tube and the open mold cavity (by injection, extruding, or other method) as the existing tube rotates, then the active die is closed after, e.g., one complete rotation, and the work piece substance is forced under pressure to form a finished profile onto the tube end (or onto both ends), on both the outside circumference and the inside circumference. The thickness of the material on the inside circumference is relatively thin, to minimize any flow restrictions.

In the tube-coupling example, the mold comprises four moving parts on the inside circumference of the tube and two moving parts on the outside circumference. These parts are mounted onto the main mechanical structure and are changed when the tube diameters are changed or when a different end condition profile is required on the tube.

The flexible apparatus allows the polymer couplings to be made on a variety of tube diameters by keeping the main apparatus structure and by changing the dies and the inserts in the dies to accommodate a variety of diameters. It is anticipated the flexible active mold in accordance with the present invention will enable the user to manufacture a range of products using the same apparatus and different dies.

Having thus described reconfigurable mold assemblies and methods of formation and use; pipe couplings; pipe assemblies using the couplings; and methods for forming and installing the couplings, all in accordance with the present invention, those of usual skill in the art will adapt the invention to other embodiments and derive other embodiments, such as forming plastic attachments on a great variety of substrates, including construction components and materials, and automobile, boat, motorcycle and airplane frames and components, limited solely by the claims appended hereto.

What is claimed is:

1. Apparatus for forming a plastic attachment along an end of a tube within a cavity of a mold, the tube comprising an inside surface and an outside surface, the apparatus comprising:
   (a) a first assembly including at least a plurality of first members adapted for gripping the tube along the outside surface thereof and for releasing the tube;
   (b) a second assembly adapted for moving the first members and the gripped tube between a first position spaced from the mold and a second position at the mold, at which second position the first members form a first end wall of the mold;
   (c) a third assembly adapted for moving to and from the mold and forming a first side wall of the mold radially outside the tube when the third assembly is at the mold;
   (d) a fourth assembly adapted for moving to and from the mold and for forming a second side wall of the mold radially inside the tube when the fourth assembly is at the mold;
   (e) a fifth assembly adapted for forming a second end wall of the mold at the end of the mold opposite the first end wall;
   (f) at least one inlet for passing plastic charge into the mold cavity;
   (g) a rotation system adapted for rotating the first assembly and thereby rotating the gripped tube around the mold cavity for distributing the plastic charge throughout the mold cavity; and
   (h) the fifth assembly further adapted for moving the second end wall along and between the first and second side walls, to apply pressure to plastic charge in the mold cavity, and thereby form the plastic charge into the shape of the mold walls and cavity.

2. The apparatus of claim 1, a section of the second side wall adjacent the end of the tube being spaced from the inside surface of the tube for forming a lip on the plastic attachment lying along the inside surface of the tube adjacent the end thereof.

3. Apparatus for forming a plastic attachment along an end of a tube within a mold, the tube comprising an inside surface and an outside surface, the apparatus comprising:
   (a) a first clamping assembly including a plurality of first members adapted for gripping the tube along the outside surface of the tube end and for releasing the tube;

(b) a second clamping assembly adapted for moving the first members and the gripped tube between a first position spaced from the mold and a second position at the mold, a leading edge of the first members forming a first circular end wall of the mold when the first members are at the second position at the mold;

(c) a third clamping assembly adapted for moving generally transverse to the tube between a first transverse position spaced from the mold and a second transverse position at the mold; the third clamping assembly comprising a plurality of second members; and the second members forming a first circular side wall of the mold radially outside the tube when the third clamping assembly is at the second transverse position at the mold;

(d) a fourth clamping assembly adapted for engaging the inside surface of the tube when the tube is at the second position, and for releasing from the tube; the fourth clamping assembly further comprising a plurality of third members; and the third members forming a second circular side wall of the mold located radially inside the tube when the fourth clamping assembly is at the second transverse position at the mold;

(e) a fifth clamping assembly adapted for moving generally parallel to the tube between a third position spaced from the mold and a fourth position at the mold; the fifth clamping assembly comprising a plurality of fourth members; and the fourth members forming a second circular end wall of the mold at the end of the mold opposite the first circular end wall when the fifth clamping assembly is at the fourth position at the mold;

(f) the mold thereby formed by the spaced apart first and second end walls and the spaced apart first and second side walls;

(g) at least one inlet for passing plastic charge into the mold;

(h) a rotation system adapted for rotating the first member and thereby rotating the gripped tube around the mold cavity; and (i) the fifth clamping assembly further adapted for moving the fourth members and the second circular end wall of the mold generally along and between the first and second end walls for applying pressure to the plastic charge to shape the plastic charge to the mold walls and cavity.

4. Apparatus for forming a plastic attachment along an edge of a moving strip within a mold, the strip comprising an inside surface and an outside surface and at least one longitudinal edge, the apparatus comprising:

(a) first means for gripping the strip along at least the outside surface of the strip end and for releasing the strip;

(b) second means for moving the first means between a first longitudinal position spaced from the mold and a second longitudinal position at the mold, to form a first end wall of the mold when the first means is at the second longitudinal position;

(c) third means adapted for moving generally transverse to the length of the strip between a first transverse position spaced from the mold and a second transverse position at the mold; the third means forming a first outer sidewall of the mold when the third means is at the second transverse position;

(d) fourth means adapted for engaging the inside surface of the strip when the strip is at the mold, and for releasing the strip; the fourth means forming a second inner sidewall of the mold when the fourth means is engaged against the inside surface of the strip;

(e) fifth means adapted for moving generally parallel to the longitudinal strip between a third longitudinal position spaced from the mold and a fourth longitudinal position at the mold; the fifth forming a second end wall of the mold at the end of the mold opposite the first end wall when the fifth means is the fourth longitudinal position;

(f) the mold thereby formed by the spaced apart first and second end walls and the spaced apart first and second side walls;

(g) at least one inlet for passing plastic into the mold; and (h) sixth means adapted for translating the first means and the gripped strip through the mold.

5. The apparatus of claim 4, wherein each of the first means, the second means, the third means, the fourth means, and the fifth means comprises a clamp assembly.

* * * * *

UNITED STATES PATENT AND TRADEMARK OFFICE
CERTIFICATE OF CORRECTION

| | | |
|---|---|---|
| PATENT NO. | : 7,175,406 B1 | Page 1 of 1 |
| APPLICATION NO. | : 10/885486 | |
| DATED | : February 13, 2007 | |
| INVENTOR(S) | : Daniel D. Freitas and Robert F. Miller | |

It is certified that error appears in the above-identified patent and that said Letters Patent is hereby corrected as shown below:

Column 8, line 28, after "first assembly including" delete "at least".

Column 10, line 29, after "the fifth" insert --means--;
        line 31, after "fifth means is" insert --at--.

Signed and Sealed this

Seventh Day of August, 2007

JON W. DUDAS
*Director of the United States Patent and Trademark Office*